(12) United States Patent
Kupsh et al.

(10) Patent No.: US 8,150,428 B2
(45) Date of Patent: Apr. 3, 2012

(54) MOBILE ORIGINATED SMS OVER A WIRELESS IP NETWORK

(75) Inventors: Jerry Kupsh, Concord, CA (US); Biren Patel, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 647 days.

(21) Appl. No.: 12/276,476

(22) Filed: Nov. 24, 2008

(65) Prior Publication Data

US 2010/0130238 A1 May 27, 2010

(51) Int. Cl.
*H04W 4/00* (2009.01)
(52) U.S. Cl. ............... 455/466; 455/412.1; 455/417; 455/432.1; 455/432.3; 455/433; 370/310.1; 370/313
(58) Field of Classification Search ........... 455/466, 455/412.1, 417, 432.1, 432.3, 433, 552.1; 370/310.1, 313
See application file for complete search history.

(56) References Cited

U.S. PATENT DOCUMENTS

| | | | |
|---|---|---|---|
| 6,512,926 B1 * | 1/2003 | Henry-Labordere | 455/445 |
| 6,718,178 B1 * | 4/2004 | Sladek et al. | 455/466 |
| 2002/0086689 A1 | 7/2002 | Moran et al. | |
| 2008/0010349 A1 * | 1/2008 | Cai et al. | 709/206 |
| 2008/0248820 A1 * | 10/2008 | Lohtia | 455/466 |
| 2008/0250482 A1 | 10/2008 | Ahtisaari | |
| 2010/0330965 A1 * | 12/2010 | Zabawskyj et al. | 455/412.1 |
| 2011/0136520 A1 * | 6/2011 | Knotts | 455/466 |

\* cited by examiner

*Primary Examiner* — Temica M Beamer (57) ABSTRACT

A method for offloads SMS messages from a voice network of a wireless carrier to a data network. The method includes sending a mobile originated SMS using hypertext transfer protocol (HTTP) from a wireless handset to a short message service center (SMSC) over a wireless data network. The method further includes conducting a lookup at the SMSC to determine the home SMSC for the originating mobile handset and sending a redirect to the mobile handset as means to facilitate a dynamic update of the home SMSC location stored on the wireless handset.

23 Claims, 9 Drawing Sheets

MOBILE ORIGINATED SMS OVER A WIRELESS IP NETWORK

BACKGROUND INFORMATION

Current short message services (SMS) offered by wireless service providers share common network elements with voice traffic. Each SMS message generates a call attempt at a mobile switching center (MSC) in a voice network, similar to a call attempt generated by a voice call. Thus, the same network resources are used for processing SMS messages as well as voice calls at the MSC. As more new applications using SMS continue to be offered, SMS traffic will increase. This increase in SMS traffic will impact the MSC's ability to process voice calls.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
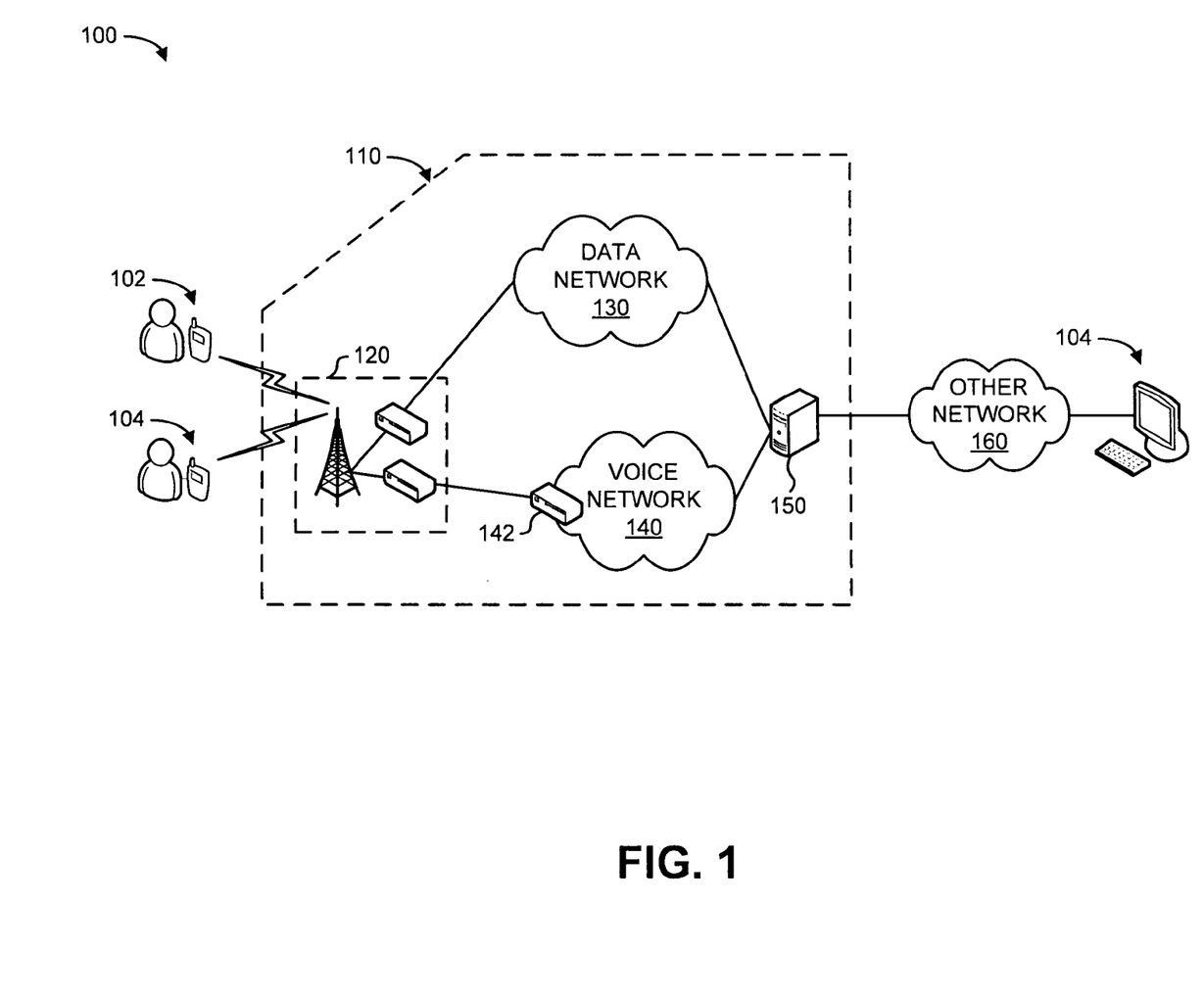
FIG. 1 depicts an exemplary network in which systems and/or methods described herein may be implemented.

Systems and/or methods described herein may permit delivery of mobile-originated (MO) Short Message Service (SMS) messages over a wireless data network. FIG. 1 depicts an exemplary network 100 in which systems and/or methods described herein may be implemented. As illustrated, network 100 may include a mobile device 102 and one or more other device(s) 104, interconnected by a wireless carrier network 110, and/or one or more other networks 160.

Mobile device 102 may include a device capable of transmitting and receiving data (e.g., voice, text, images, and/or multimedia data) over a wireless network. For example, mobile device 102 may include a handheld device, such as a cellular telephone, an Internet protocol (IP) telephone, a personal digital assistant (PDA); a portable game and/or music playing device; and/or a conventional laptop and/or palmtop receiver or other appliance that includes a radiotelephone transceiver with Mobile Internet Protocol (Mobile IP) capabilities. In one implementation, mobile device 102 may communicate via packet-based or non-packet-based wireless transmissions.

Other device(s) 104 may each include any type of device that is able to communicate via a network. For example, other device(s) 104 may include any type of device that is capable of transmitting and receiving data (e.g., voice, text, images, and/or multimedia data) to/from a network. In an exemplary implementation, other device(s) 104 may include a mobile device similar to mobile device 102. In another exemplary implementation, other device(s) 104 may include a desktop computer or other fixed-location computing devices. Other device(s) 104 may connect to network 160 via wired and/or wireless connections.

In one implementation, mobile device 102 and/or other device(s) 104 may include hardware- and/or software-based logic that maintains a TCP/IP-based messaging client (e.g., a SMS client application). Mobile device 102 and/or other device(s) 104 may each include one or more messaging clients (e.g., a SMS client, a MMS client, an e-mail client, etc.).

Wireless carrier network 110 may include a network that transfers information. For example, wireless carrier network 110 may include a radio access network (RAN) 120, a data network 130, a voice network 140, and a short message service center (SMSC) 150. Implementations of wireless carrier network 110 may include cellular networks and/or other types of wireless networks, such as ad hoc wireless networks, free-space optical networks, etc. Wireless carrier network 110 may send and/or receive information via packet-based or non-packet-based exchanges. In one implementation, wireless carrier network 110 may be operated by a service provider that provides wireless communication services to a customer, such as a user of mobile device 102 and/or other device(s) 104, as a managed service (e.g., for a monthly fee). Wireless carrier network 110 may send and/or receive encrypted information and/or unencrypted information.

RAN 120 may include a variety of components to facilitate mobile communications, such as antennas, base transceiver stations (BTS), base station controller (BSC), and/or interfaces for packet data servicing nodes (PDSNs) and/or mobile switching centers (MSCs), such as MSC 142.

Data network 130 may include components that facilitate packet data traffic, including for example, one or more load balancers, gateways, and databases connected by a core infrastructure (not shown). A PDSN may serve as an access gateway to data network 130.

Voice network 140 may include elements that facilitate voice traffic and/or SMS traffic through voice network 140, such as mobile MSC 142, a home location register (HLR), a signal transfer point (STP), and Signaling System 7 (SS7) links within voice network 140. Using, for example, American National Standard Institute (ANSI)-41 protocol and other protocols, each SMS message passing through voice network 140 can generate a call attempt at an MSC (such as MSC 142), similar to a call attempt generated by a voice call. Thus, within voice network 140, the same resources may be used for processing SMS messages as well as voice calls.

SMSC 150 may include one or more devices for implementing SMS in a mobile telephone network, such as data network 130 and/or voice network 140. If a user (e.g., using mobile device 102) sends a text message (e.g., a SMS message) to another user (e.g., using one of other device(s) 104, also referred to herein as a "terminating device"), the message may be received and forwarded by SMSC 150 to the other device 104. In one implementation, SMSC 150 may receive the text message from mobile device 102 via data network 130 and may forward the text message to the destination user via voice network 140. SMSC 150 may generally be responsible for locating the terminating device and submitting the message to the terminating device. In another implementation, SMSC 150 may also convert the format of a MO SMS message to a format suitable for transmission over a wireless voice network prior to submitting the message to the terminating device. While a single SMSC 150 is shown in FIG. 1, network 100 may include multiple SMSCs.

Other network 160 may include one or more networks including another wireless network, a satellite network, the Internet, a telephone network, such as the Public Switched Telephone Network (PSTN), a metropolitan area network (MAN), a wide area network (WAN), a local area network (LAN), a mesh network, or another type of network. In an exemplary implementation, network 160 may include a combination of networks and other components (e.g., switches, routers, etc.) for transmitting data to and/or from mobile device 102, other device(s) 104, and/or SMSC 150.

Systems and/or methods described herein may permit delivery of SMS messages originating from mobile device 102 over a wireless packet data network, such as data network 130. Thus, systems and/or methods described herein may eliminate MO SMS traffic on voice network 140/MSC 142. Data network 130 may use any wireless communication standard, such as code division multiple access (CDMA), global system for mobile communications (GSM) or Wireless Fidelity (WiFi). For purposes of simplicity and without limitation, implementations will be described herein in the context of a 1× Evolution-Data Optimized (1×EVDO) Packet Data Network and Session Initiated Protocol (SIP).

Although FIG. 1 shows exemplary components of network 100, in other implementations, network 100 may contain fewer, additional, different, or differently arranged components than depicted in FIG. 1. In still other implementations, one or more components of network 100 may perform one or more other tasks described as being performed by one or more other components of network 100.

Figure 2:
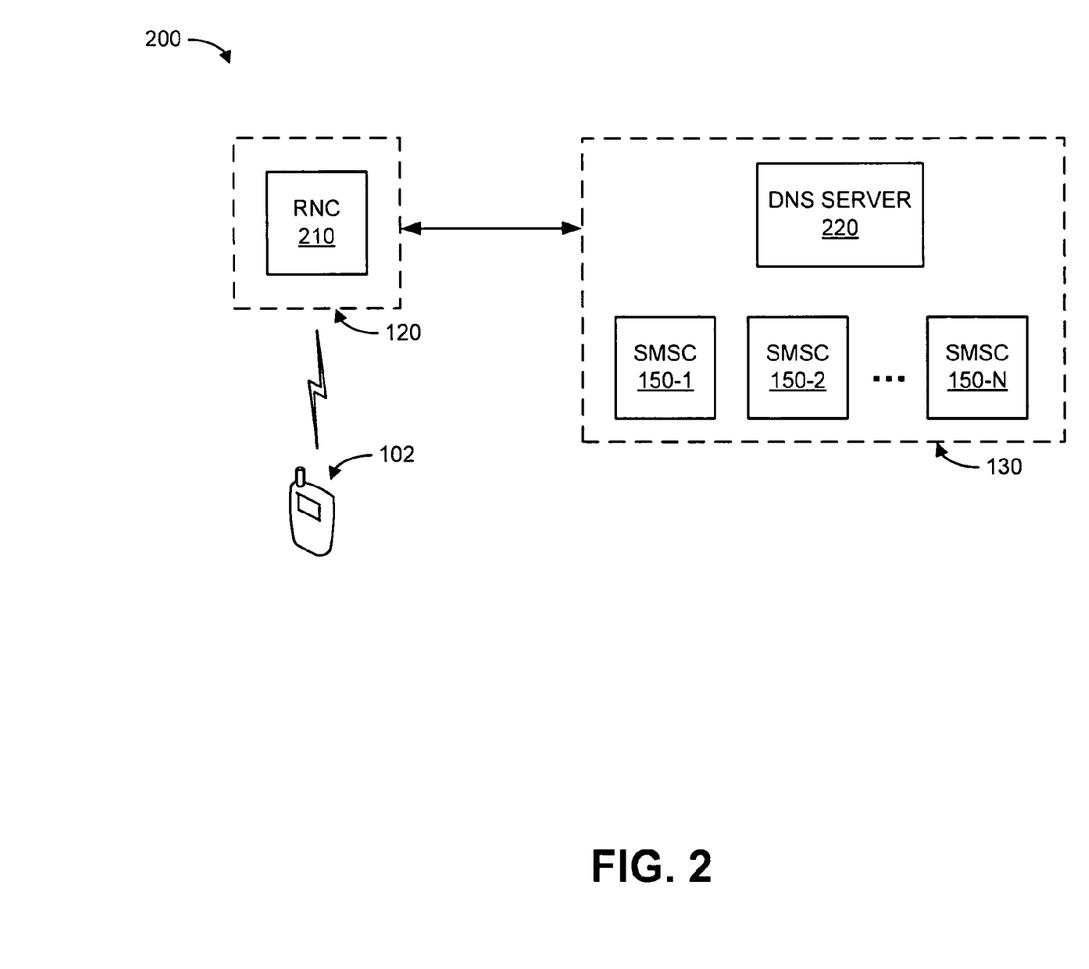
FIG. 2 provides an illustration of an exemplary portion of a wireless carrier network of FIG. 1.

FIG. 2 provides an illustration of an exemplary portion 200 of wireless carrier network 110. Implementations described herein may use network portion 200 to provide MO SMS over data network 130. As illustrated, network portion 200 may include a radio network controller (RNC) 210; a domain name system (DNS) server 220; and SMSCs 150-1, 150-2, . . . 150-N (collectively referred to SMSCs 150). In the exemplary implementation of FIG. 2, RNC 210 may be considered part of RAN 120, while DNS server 220 and SMSCs 150 may be considered part of data network 130. Mobile device 102 may include the features described above in connection with, for example, FIG. 1.

RNC 210 may provide radio access functions that permit mobile device 102 to connect to data network 130. RNC 210 may also provide an interface to data network 130 for data services.

DNS server 220 may include one or more server entities, or other types of computation or communication devices, that may perform DNS lookup functions for data network 130. Through DNS server 220, domain names and/or hostnames (e.g., smsc10.mywireless.com) may be mapped to their official Internet Protocol (IP) addresses (e.g., IPv4 or IPv6 addresses). As used herein, the terms "uniform resource locator (URL)," "domain name" and "hostname" may be used interchangeably to refer to a text-based identifier for an Internet protocol (IP) address. DNS server 220 may perform a DNS lookup so that the request from mobile device 102 can be appropriately routed through network 130 to one of SMSCs 150.

SMSCs 150 may include the features described above in connection with, for example, FIG. 1. Each SMSC 150 may be designated to service text messages for particular Numbering Plan Area-Numbering Plan Exchange (NPA/NXX) ranges. The SMSC assigned to a particular mobile directory number (MDN) may be referred to herein as a "home SMSC" for a device using that particular MDN. Thus, in implementations described herein, each SMSC 150 can identify an appropriate SMSC 150 to provide a MO SMS messages sent via data network 130 to one or more particular recipient. As further described herein, each SMSC 150 may use a SMSC/MDN lookup table to allow mobile device 102 to identify the home SMSC 150 for the originating MDN of the SMS message (e.g., the MDN of mobile device 102).

Although FIG. 2 shows exemplary components of network portion 200, in other implementations, network portion 200 may contain fewer, additional, different, or differently arranged components than depicted in FIG. 2. In still other implementations, one or more components of network portion 200 may perform one or more other tasks described as being performed by one or more other components of network portion 200.

Figure 3:
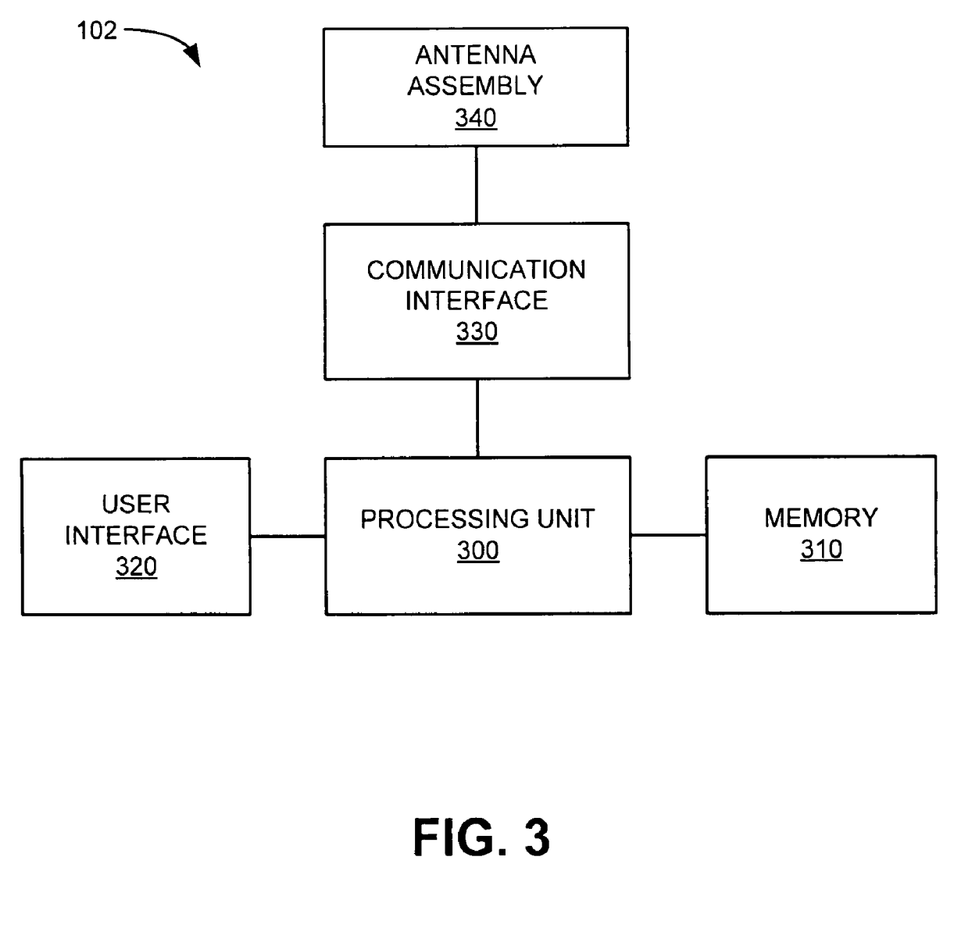
FIG. 3 is a diagram of exemplary components of a mobile device of FIGS. 1 and 2.

FIG. 3 is a diagram of exemplary components of mobile device 102. As illustrated, mobile device 102 may include a processing unit 300, memory 310, a user interface 320, a communication interface 330, and/or an antenna assembly 340.

Processing unit 300 may include a processor, a microprocessor, an application specific integrated circuit (ASIC), a field programmable gate array (FPGA), or the like. Processing unit 300 may control operation of mobile device 102 and its components. In one implementation, processing unit 300 may control operation of components of mobile device 102 in a manner described herein.

Memory 310 may include a random access memory (RAM), a read-only memory (ROM), and/or another type of memory to store data and instructions that may be used by processing unit 300.

User interface 320 may include mechanisms for inputting information to mobile device 102 and/or for outputting information from mobile device 102. Examples of input and output mechanisms might include buttons (e.g., control buttons, keys of a keypad, a joystick, etc.) or a touch screen interface to permit data and control commands to be input into mobile device 102; a speaker to receive electrical signals and output audio signals; a microphone to receive audio signals and output electrical signals; and/or a display to output visual information (e.g., text input into mobile device 102).

Communication interface 330 may include, for example, a transmitter that may convert baseband signals from processing unit 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network (e.g., wireless carrier network 110).

As will be described in detail below, mobile device 102 may perform certain operations described herein in response to processing unit 300 executing software instructions of an application contained in a computer-readable medium, such as memory 310. A computer-readable medium may be defined as a physical or logical memory device. The software instructions may be read into memory 310 from another computer-readable medium or from another device via communication interface 330. The software instructions contained in memory 310 may cause processing unit 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of mobile device 102, in other implementations, mobile device 102 may contain fewer, additional, different, or differently arranged components than depicted in FIG. 3. In still other implementations, one or more components of mobile device 102 may perform one or more other tasks described as being performed by one or more other components of mobile device 102.

Figure 4:
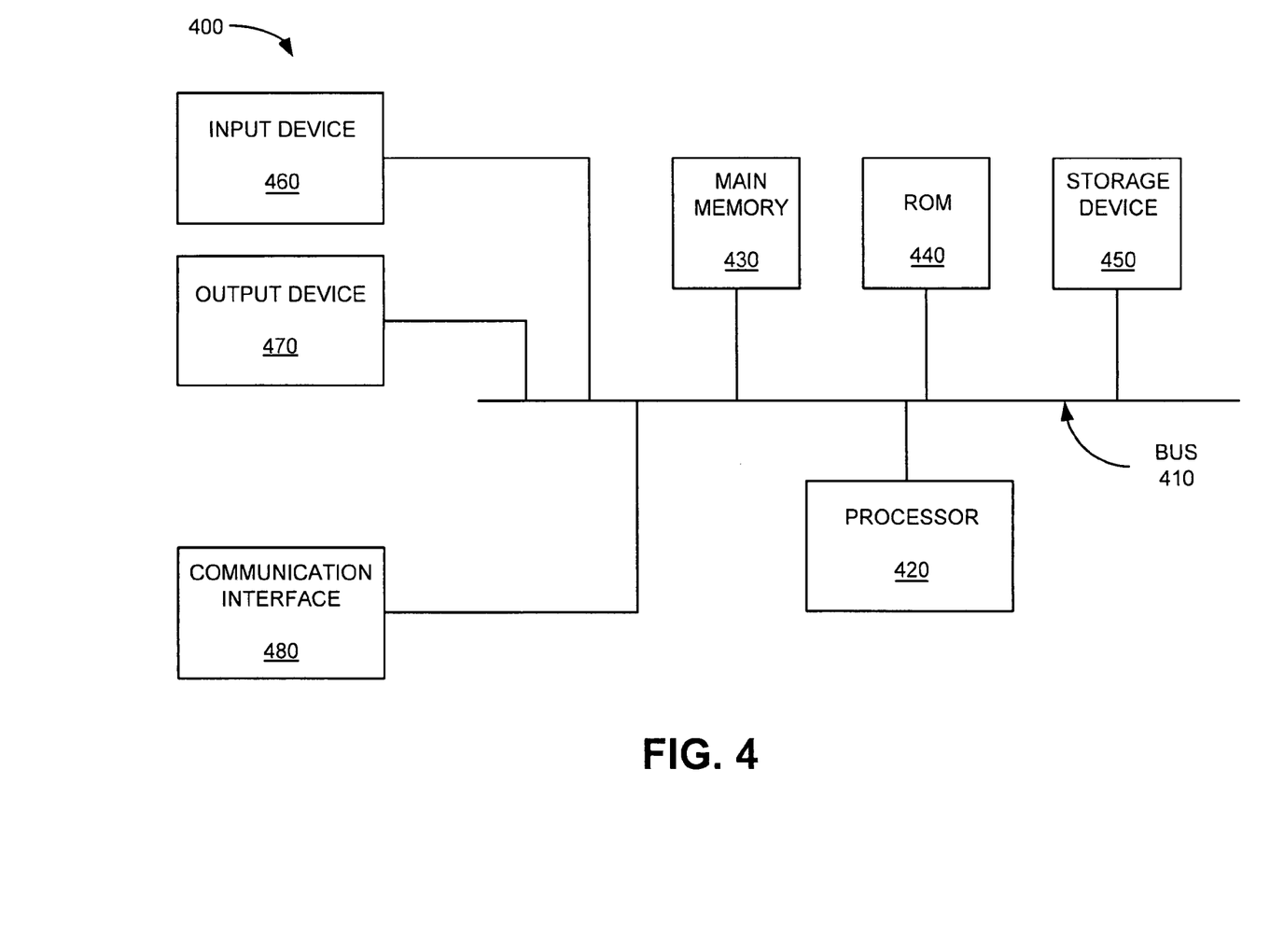
FIG. 4 is an exemplary diagram of a device that may correspond to other devices, short message service centers (SMSCs), a radio network controller, or a domain name service (DNS) server of FIG. 2.

FIG. 4 is an exemplary diagram of a device 400 that may correspond to any of other device(s) 104, SMSCs 150, RNC 210, and/or DNS server 220. As illustrated, device 400 may include a bus 410, a processor 420, a main memory 430, a ROM 440, a storage device 450, an input device 460, an output device 470, and a communication interface 480.

Bus 410 may include conductors or a pathway that permit communication among the components of device 400. Processor 420 may include a processor(s), a microprocessor(s), or processing logic that interprets and executes instructions. Main memory 430 may include a RAM or another type of dynamic storage device that stores information and instructions for execution by processor 420. ROM 440 may include a ROM device or another type of static storage device that stores static information and instructions for use by processor 420. Storage device 450 may include a magnetic and/or optical recording medium and its corresponding drive.

Input device 460 may include one or more mechanisms that permit a user to input information to device 400, such as a keyboard, a key pad, a button, a touch screen, a touch pad, a mouse, etc. Output device 470 may include one or more mechanisms that output information to the user, including a display, a light emitting diode, a speaker, etc. Communication interface 480 may include any transceiver-like mechanism that enables device 400 to communicate with other devices and/or systems. For example, communication interface 480 may include mechanisms for communicating with another device or system via a network, such as wireless carrier network 110 and/or other network 160.

As described herein, device 400 may perform certain operations in response to processor 420 executing software instructions contained in a computer-readable medium, such as main memory 430. The software instructions may be read into main memory 430 from another computer-readable medium, such as storage device 450, or from another device via communication interface 480. The software instructions contained in main memory 430 may cause processor 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may contain fewer, additional, different, or differently arranged components than depicted in FIG. 4. In still other implementations, one or more components of device 400 may perform one or more other tasks described as being performed by one or more other components of device 400.

Figure 5:
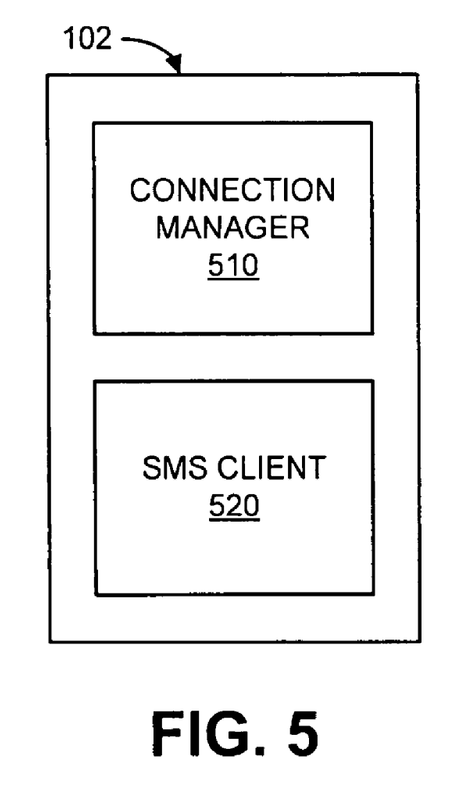
FIG. 5 is a functional block diagram of the mobile device of FIGS. 1 and 2.

FIG. 5 is a functional block diagram of exemplary components of mobile device 102. As shown in FIG. 5, mobile device 102 may include a connection manager 510 and a SMS client 520.

Connection manager 510 may include hardware- and/or software-based logic that receives and sends information using IP messaging over a Transmission Control Protocol (TCP) connection. Connection manager 510 may acquire a wireless data session when a SMS message is to be sent. In one implementation, connection manager 510 may initiate and/or terminate TCP connections with a server, such as SMSC 150. Connection manager 510 may also provide acknowledgements to SMSC 150 in response to messages from SMSC 150. Connection manager 510 may further terminate the wireless data session after a particular period of no SMS activity to conserve network resources.

SMS client 520 may include hardware- and/or software-based logic that uses a wireless data network protocol to send SMS over data network 130. In one implementation, the wireless data network protocol for SMS delivery may imitate multimedia messaging service (MMS) protocols. For example, SMS client 520 may format a hypertext transfer protocol (HTTP) post that includes a user agent identifier for the mobile device, the MDN of the originating device, the MDN of the intended recipient device, the SMS message text (e.g., up to 160 characters), and a unique message identifier (ID). The HTTP post maybe used to request that a SMSC, such as SMSC 150, accept a SMS message enclosed in the request. In one implementation SMS client 520 may store a default hostname (e.g., smsc10.mywireless.com) for one SMSC 150 of wireless carrier network 110. The default hostname may be assigned, for example, by the original equipment manufacturer (OEM) of mobile device 102 and may (or may not) be the home SMSC for the MDN of mobile device 102. As described further herein, SMS client 520 may later receive and store the hostname for its home SMSC 150-1 (e.g., the SMSC assigned to the MDN associated with mobile device 102) for use in future MO SMS messages. SMS client 520 may initiate sending the HTTP post to its home SMSC 150 using the stored hostname.

SMS client 520 may also support SMS functionality for receiving SMS messages over a voice network (e.g., voice network 140). In another implementation, SMS client 520 may support SMS functionality for sending SMS messages over a voice network if a wireless data connection cannot be established by connection manager 510.

Although FIG. 5 shows exemplary functional components of mobile device 102, in other implementations, mobile device 102 may contain fewer, additional, different, or differently arranged functional components than depicted in FIG. 5. In still other implementations, one or more functional components of mobile device 102 may perform one or more other tasks described as being performed by one or more other functional components of mobile device 102.

Figure 6:
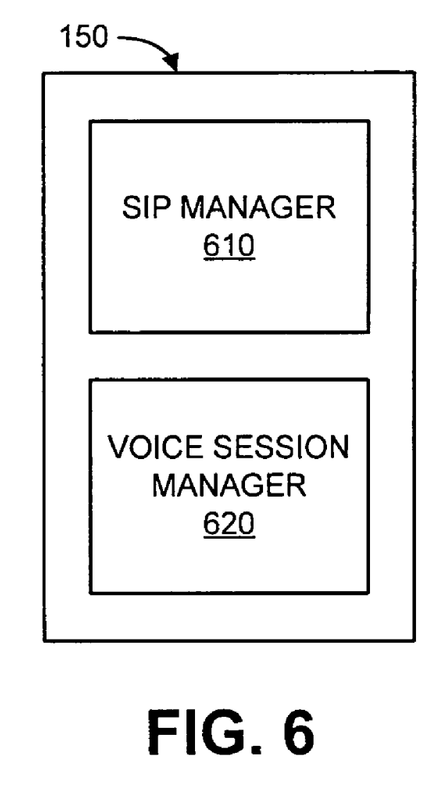
FIG. 6 is a functional block diagram of one of the SMSCs of FIG. 2.

FIG. 6 provides a functional block diagram of SMSC 150. As shown in FIG. 6, SMSC 150 may include a SIP manager 610 and a voice session manager 620. SIP manager 610 and voice session manager 620 may enable SMSC 150 to receive SMS messages over data network 130 and send SMS messages over voice network 140. For example, SIP manager 610 may communicate with mobile device 102 to receive SMS messages over data network 130. SIP manager 610 may receive MO SMS messages using a data network protocol and may process the message accordingly. In one implementation, SIP manager 610 may reformat the MO SMS message into a conventional format for delivery to a terminating device over voice network 140.

In one implementation, SIP manager 610 may store and retrieve (e.g., from main memory 430) a SMSC/MDN lookup table to identify whether the SMSC that receives an MO SMS from mobile device 102 is the home SMSC (e.g., SMSC 150-1) for the originating mobile device 102. For example, based on the originating MDN provided in an HTTP/SMS message from mobile device 102, SIP manager 610 of SMSC 150-2 may conduct a lookup in the SMSC/MDN lookup table to identify the hostname of SMSC 150-1, which may be the designated SMSC for the originating mobile device. SIP manager 610 may provide, to the originating mobile device 102, the hostname of the designated SMSC for the MDN of mobile device 102.

Voice session manager 620 may send message to mobile device 102 and/or other devices 104 using known protocols for voice network 140, such as Signaling System 7 (SS7) protocols. When data network 130 is unable to be used for MO SMS message traffic, voice session manager 620 may also receive MO SMS messages from mobile device 102.

Although FIG. 6 shows exemplary functional components of SMSC 150, in other implementations, SMSC 150 may contain fewer, additional, different, or differently arranged functional components than depicted in FIG. 6. In still other implementations, one or more functional components of SMSC 150 may perform one or more other tasks described as being performed by one or more other functional components of SMSC 150.

Figure 7:
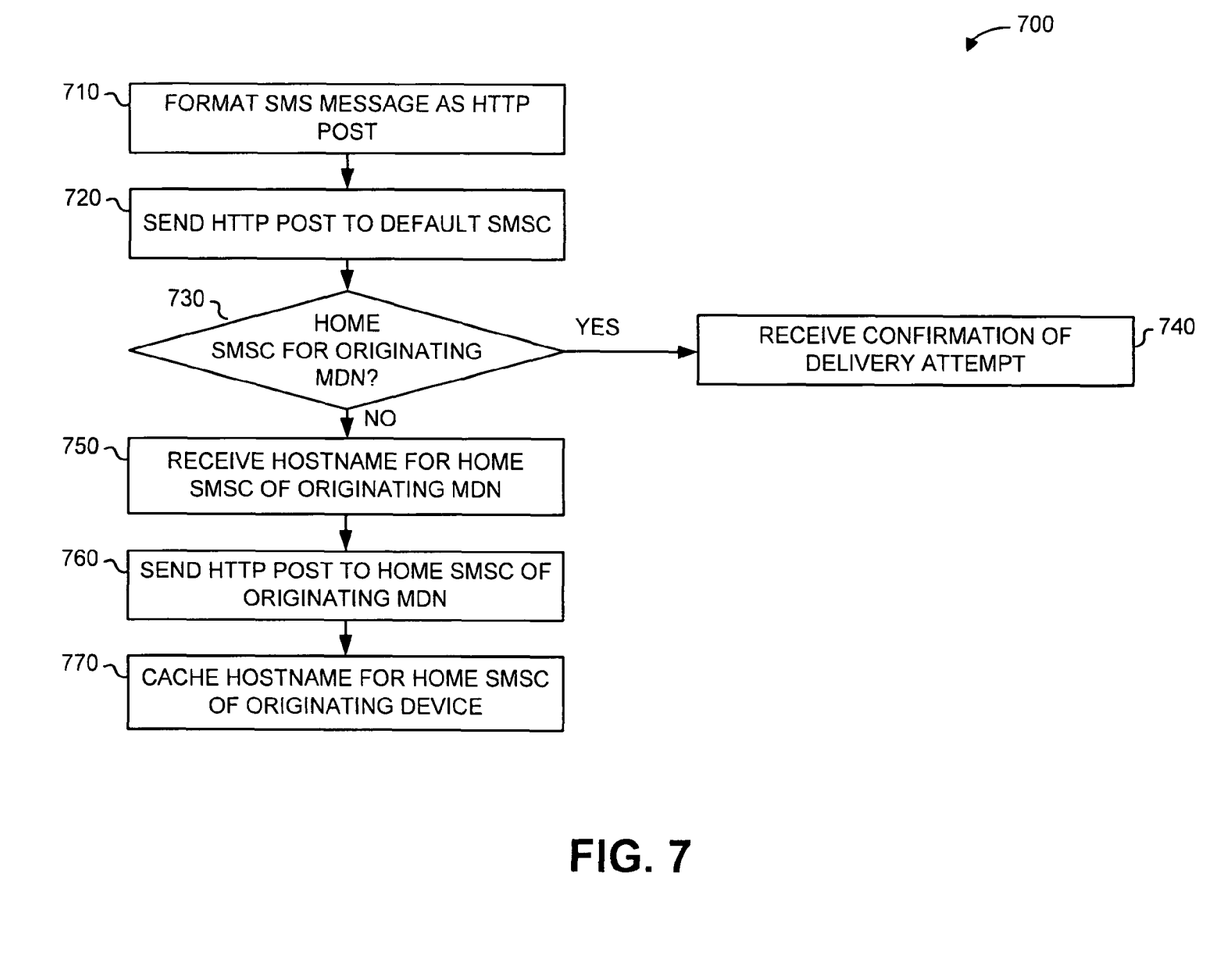
FIG. 7 is a flow chart illustrating an exemplary process for sending mobile-originated (MO) Short Message Service (SMS) messages to a SMSC over a wireless data network according to implementations described herein.

FIG. 7 provides a flow chart of an exemplary process 700 for sending MO SMS messages to a SMSC over a wireless data network according to implementations described herein. Process 700 may be performed by a mobile device, such as mobile device 102. In one implementation, the process may be performed by hardware, software, or a combination of hardware and software components of a mobile device, such as mobile device 102 running an IP application client. Process 700 may begin when a user initiates sending a SMS message from a mobile device.

The SMS message may be formatted as a HTTP post (block 710). For example, mobile device 120 may format the SMS text input by the user into a HTTP post that includes, for example, a user agent identification, the MDN of one or more intended recipient, the message text (e.g., up to 160 characters), and a session ID.

The HTTP post may be sent to a default SMSC (block 720). For example, mobile device 102 may send the HTTP post to the IP address of a SMSC, such as SMSC 150-1, that is identified within the mobile device (e.g., in SMS client 520) as the default SMSC for the mobile device (e.g., the hostname assigned by the OEM of mobile device 102). In an exemplary implementation, mobile device 102 (using, e.g., connection manager 510) may send a request to a DNS server, such as DNS server 220, to identify an IP address associated with a hostname for the mobile device's default SMSC. Mobile device 102 may use the IP address received from the DNS server to send the HTTP post to the default SMSC.

It may be determined if the default SMSC of the originating mobile device is the home SMSC for the originating MDN (block 730). For example, mobile device 102 may receive a message from SMSC 150-1 indicating that SMSC 150-1 either is or is not the appropriate server to receive a SMS message from the originating MDN (e.g., the MDN of mobile device 102). If it is determined that the default SMSC of the originating mobile device is the home SMSC for the originating MDN (block 730—YES), a confirmation of a delivery attempt may be received (block 740). For example, mobile device 102 may receive a message from SMSC 150-1 that the SMS message was transmitted to the MDN of the intended recipient.

If it is determined that the default SMSC of the originating mobile device is not the home SMSC for the originating MDN (block 730—NO), a hostname for the home SMSC for the originating MDN may be received (block 750). For example, mobile device 102 may receive a message from SMSC 150-1 indicating the hostname for the home SMSC for the originating MDN (e.g., SMSC 150-2). In another implementation, SMSC 150-1 may provide an IP address for SMSC 150-2. The hostname or the IP address may be identified by SMSC 150-1 using, for example, a SMSC/MDN lookup table that cross-references MDN ranges with IP addresses and/or URLs of the SMSCs that handle those MDNs.

The HTTP post may be sent to the home SMSC for the originating MDN (block 760). For example, mobile device 102 may send the HTTP post to the SMSC, such as SMSC 150-2, that is the designated home SMSC for the originating MDN. In an exemplary implementation, mobile device 102 (using, e.g., connection manager 510) may send a request to a DNS server, such as DNS server 220, to identify an IP address associated with a hostname for the originating MDN's home SMSC. Mobile device 102 may use the IP address received from the DNS server to send the HTTP post to SMSC 150-2.

The hostname for the home SMSC of the originating MDN may be cached (block 770). For example, mobile device 102 may optionally store the hostname (or IP address) of SMSC 150-2 and may associate the hostname with its MDN to more quickly facilitate SMS message delivery in the future.

Figure 8:
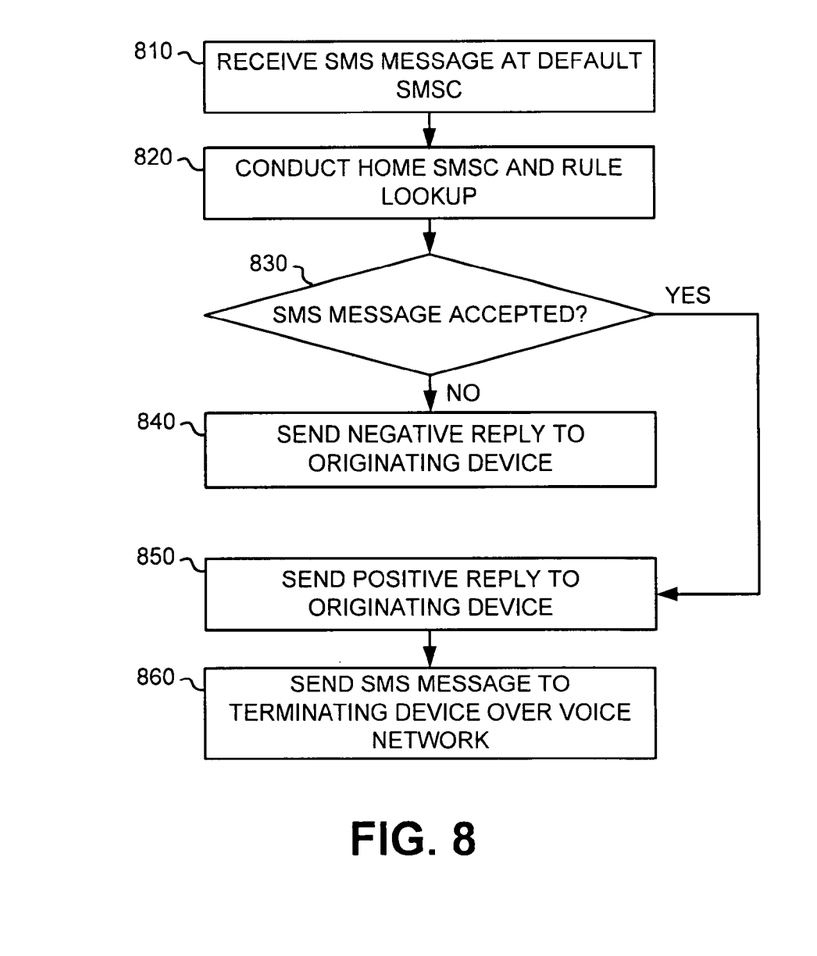
FIG. 8 is a flow chart illustrating an exemplary process for receiving MO SMS messages over a wireless data network according to implementations described herein.

FIG. 8 provides a flow chart of an exemplary process 800 that may be performed in receiving MO SMS messages over a wireless data network according to implementations described herein. Process 800 may be performed by a SMSC, such as SMSC 150-1. In one implementation, the process may be performed by hardware, software, or a combination of hardware and software components of a SMSC in conjunction with a DNS server, such as DNS server 220. Process 800 may begin when a user sends a SMS message from a mobile device via data network 130.

The SMS message may be received at the default SMSC of the originating mobile device (block 810). For example, SMSC 150-1 may receive a HTTP/SMS message from mobile device 102 via data network 130.

A home SMSC lookup and/or rule lookup may be conducted (block 820). For example, SMSC 150-1 may conduct a look-up to determine which SMSC is the home SMSC of the originating MDN (e.g., the MDN of mobile device 102) and/or if the originating device (e.g., mobile device 102) complies with particular application-specific rules. In an exemplary implementation, the home SMSC of the originating MDN may be determined by SMSC 150-1 using a SMSC/MDN lookup table that cross-references MDN ranges with particular SMSCs that service the MDN ranges. The hostname or the IP address of each SMSC may also be identified using the SMSC/MDN lookup table. The application-specific rules may include, for example, parental controls, content filters, SMS activation, account status, etc.

It may be determined if the SMS message is accepted (block 830). For example, SMSC 150-1 may determine that the SMS message is accepted if the message passes the application-specific rules and if SMSC 150-1 is the home SMSC for the originating MDN. Conversely, SMSC 150-1 may determine that the SMS message is not accepted if the message fails one or more of the application-specific rules and/or if SMSC 150-1 is not the home SMSC for the originating MDN.

If it is determined that the SMS message is not accepted (block 830—NO), a negative reply may be sent to the originating device. For example, SMSC 150-1 may send a negative reply to mobile device 102 using HTTP. In one implementation, the negative reply may include a redirect code with the hostname or IP address for the home SMSC for the originating MDN (e.g., HTTP 302: <new hostname>). For example, SMSC 150-1 may send the hostname of SMSC 150-2 to mobile device 102. In other implementations, the negative reply may include an indication of a particular error based on applied rules for mobile device 102. For example, the negative reply may indicate activity outside of limits set by parental controls (e.g., HTTP XXX: <Usage Control Error>); the negative reply may indicate filter restrictions for particular recipients (e.g., HTTP XXX: <Content Filtering Error>); the negative reply may indicate account status errors, such a exceeding a prepaid account limit (e.g., HTTP XXX: <Prepaid Error>); or the negative reply may indicate a block on SMS services for the mobile device (e.g., HTTP XXX: <SMS Blocked>). If a negative reply is sent to mobile device 102, SMSC 150-1 may not deliver the SMS message to the intended terminating device.

If it is determined that the SMS message is accepted (block 830 - YES), a positive reply may be sent to the originating device (block 850), and the SMS message may be sent to the terminating device over the voice network (block 860). For example, SMSC 150-1 may send a positive reply to mobile device 102 (e.g., HTTP XXX: <Message Accepted>). SMSC 150-1 may also send the SMS message to the intended recipient, such as one of other devices 104, using voice network 140 and conventional SMS-over-voice protocols (e.g., ANSI-41). In another implementation, where the HTTP/SMS message includes destination numbers for multiple recipients, SMSC 150-1 may send the SMS message to each of the recipients using voice network 140 and conventional SMS-over-voice protocols.

Figure 9:
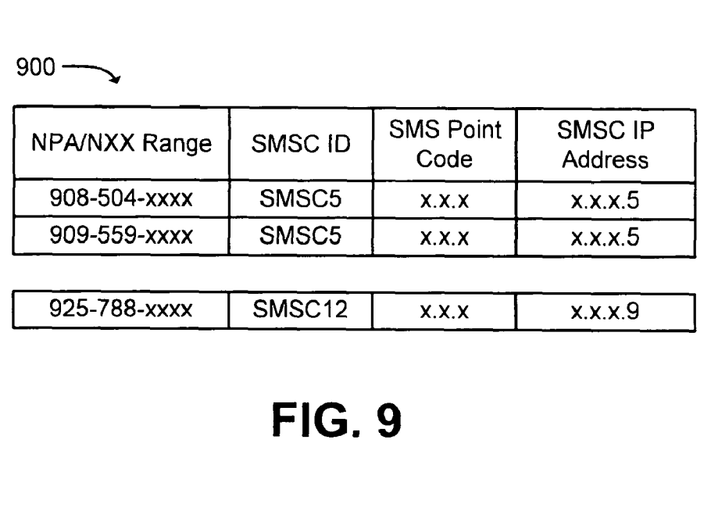
FIG. 9 is an exemplary data structure of a portion of a SMSC/MDN lookup table according to implementations described herein.

FIG. 9 shows an exemplary data structure of a portion of a SMSC/MDN lookup table 900 according to implementations described herein. As shown in FIG. 9, SMSC/MDN lookup table 900 may include a column for Numbering Plan Area-Numbering Plan Exchange ranges ("NPA/NXX range"), a column for the SMSC associated with each NPA/NXX ("SMSC ID"), a column for the SMS point code ("SMS Point Code), and a column for the SMSC IP address of the SMSC associated with each NPA/NXX ("SMSC IP Address"). In other implementations, table 900 may include fewer, additional, different, or differently arranged columns than depicted in FIG. 9. SMSC 150 may use table 900 to identify the appropriate home SMSC for an SMS message (e.g., the home SMSC for the MDN of the originating device). SMSC 150 may associate the particular MDN of the originating device with a NPA/NXX range in table 900. The NPA/NXX range may be correlated to a particular SMSC and SMSC IP address within the same row of the NPA/NXX range. The SMS point code column of table 900 may not be required to identify the appropriate home SMSC for an originating MDN. However the SMS point code may be used by SMSC 150 to send SMS messages over voice network 140 (using, e.g. ANSI-41 protocol).

Figure 10:
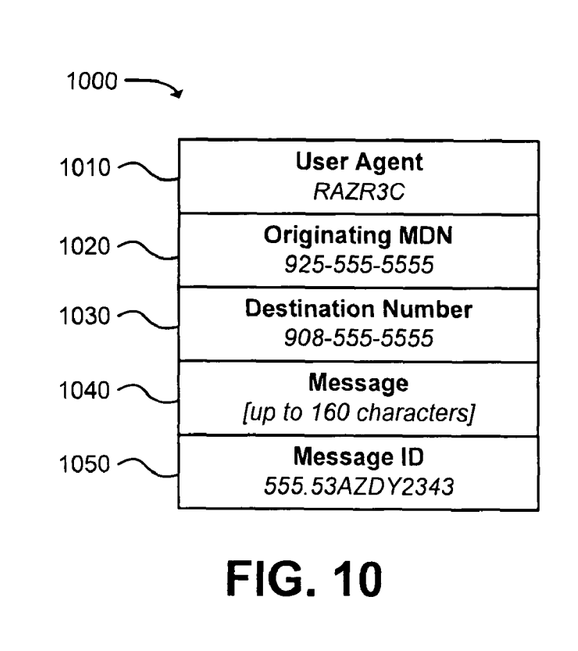
FIG. 10 is an exemplary data structure of a SMS message that may be sent by a mobile device to a SMSC.

FIG. 10 provides an exemplary data structure 1000 of a SMS message that may be sent by a mobile device to a SMSC, as described, for example, in block 720 of FIG. 7. The message may be in the form of a HTTP post sent via data network 130. Data structure 1000 may include a user agent section 1010, an originating MDN section 1020; a destination number section 1030, a message section 1040, and a message ID section 1050. User agent section 1010 may include an indication of the type of mobile device (e.g., mobile device 102) from which the HTTP/SMS message is originating (e.g., "RAZR3C"). Originating MDN section 1020 may include the MDN of the originating device, such as mobile device 102 (e.g., "925-555-5555). The originating MDN may be used by a SMSC, such as SMSC 150-1, to determine the home SMSC for the originating device. Destination number section 1030 may include the MDN of the terminating device, such as one of other devices 104 (e.g., "908-555-5555"). Alternatively, a destination number may include a short code (such as a short code for a value-added service provider (VASP)), alias, instant message (IM) handle or email address associated with the terminating device. In another implementation, a destination number section 1030 may include a destination number for more than one recipient. Message section 1040 may include the SMS message text provided by the user of mobile device 102. Text in message section 1040 may be limited to "160" characters to comply with SMS protocol for voice network transmissions. Message ID section 1050 may include a unique message identifier for the particular SMS message sent from mobile device 102.

Figure 11:
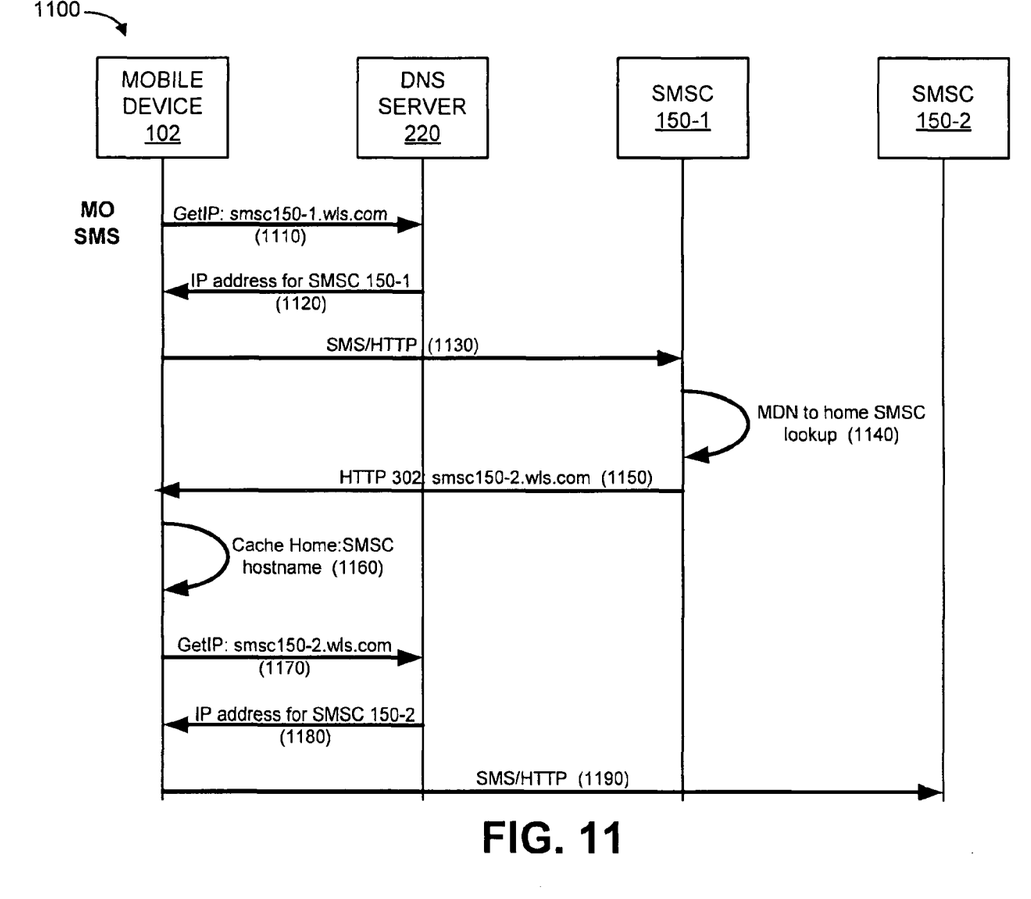
FIG. 11 depicts a diagram of an exemplary message flow capable of being performed on the exemplary network portion illustrated in FIG. 2.

FIG. 11 depicts a diagram of an exemplary message flow 1100 capable of being performed on the exemplary portion of the network illustrated in FIG. 2. Exemplary message flow 1100 is described in the context of a 1× Evolution-Data Optimized (1×EVDO) Packet Data Network and Session Initiated Protocol (SIP). For discussion of FIG. 11, it may be assumed that mobile device 102 has set up a point-to-point protocol (PPP) data session and is ready to send and receive SMS messages in SIP via the 1×EVDO network.

Mobile device 102 (e.g., using connection manager 510 and SMS client 520) may send a request to DNS server 220 for the IP address for SMSC 150-1, which may be the default SMSC for mobile device 102 (line 1110). The request may include the hostname for SMSC 150-1 (e.g., "smsc150-1.wls.com"). DNS server 220 may reply to mobile device 102 with the IP address for SMSC 150-1 (line 1120). Mobile device 102 may use the IP address of SMSC 150-1 to send a HTTP post including a SMS message to SMSC 150-1 (line 1130). The HTTP post may include, among other information, the MDN of mobile device 102. SMSC 150-1 may perform a lookup of the home SMSC associated with the mobile device 102 using, for example, a SMSC/MDN lookup table (line 1140). SMSC 150-1 may identify a different SMSC, SMSC 150-2, as the home SMSC for the mobile device 102. Thus, SMSC 150-1 may reply to mobile device 102 with a redirect message (e.g., "HTTP 302: smsc150-2.wls.com") providing the hostname for SMSC 150-2 (line 1150).

Mobile device 102 may receive the hostname for SMSC 150-2 and may store the URL in a local memory so that the URL can be used for subsequent MO SMS messages to the terminating device (line 1160). Based on the URL for SMSC 150-2 (e.g., "smsc150-2.wls.com"), mobile device 102 may send a request to DNS server 220 for the IP address for SMSC 150-2 (line 1170). DNS server 220 may reply to mobile device 102 with the IP address for SMSC 150-2 (line 1180). Mobile device 102 may use the IP address of SMSC 150-2 to send a HTTP post including a SMS message to SMSC 150-2 (line 1190). The HTTP post may include a user agent identification and MDN for mobile device 102, the MDN of the terminating device, the message text (e.g., up to 160 characters), and a message ID. Based on the request from mobile device 102, SMSC 150-2 may conduct a home SMSC lookup and/or a rule lookup to determine if the SMS message can be accepted by SMSC 150-2. If accepted, SMSC 150-2 can extract the SMS message text and forward the SMS message to the MDN of the terminating device over a wireless voice network.

Systems and/or methods described herein may provide for delivery of SMS messages from a mobile device to a SMSC via a wireless data network. The SMSC may receive the SMS message embedded in a HTTP post that also includes a mobile directory number (MDN) of the originating device. The SMSC may conduct a SMSC/MDN lookup to determine a home SMSC for the originating device based on the MDN. If the SMSC is not the home SMSC for the originating device, the SMSC, using the wireless data network, may send a redirect message to the mobile device. If the SMSC is the home SMSC for the originating device, the SMSC may send the SMS message over a wireless voice network to the terminating device.

The foregoing description provides illustration and description, but is not intended to be exhaustive or to limit the embodiments to the precise form disclosed. Modifications and variations are possible in light of the above teachings or may be acquired from practice of systems and methods disclosed herein.

For example, while some implementations herein have been described in the context of a SMSC performing a home SMSC lookup based on the MDN, in other implementations the home SMSC lookup may be conducted by a DNS server or another entity.

Also, while series of blocks and lines have been described with regard to the flowcharts of FIGS. 7, 8, and 11, the order of the blocks and/or lines may differ in other implementations. Further, non-dependent acts may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code-it being understood that software and control hardware may be designed to implement the embodiments based on the description herein.

Further, certain implementations described herein may be implemented as "logic" that performs one or more functions. This logic may include hardware, such as a processor, microprocessor, an application specific integrated circuit or a field programmable gate array; or a combination of hardware and software.

It should be emphasized that the term "comprises" and/or "comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by a mobile device, the method comprising:
    formatting a short message service (SMS) message as a hypertext transfer protocol (HTTP) post, the HTTP post including a mobile directory number (MDN) of the mobile device;
    sending the HTTP post over a wireless data network to a default short message service center (SMSC) for the mobile device;
    receiving a confirmation from the default SMSC for the mobile device if the default SMSC determines, based on the MDN, that the default SMSC is also a home SMSC for the mobile device; and
    receiving one of a hostname of the home SMSC for the mobile device or an Internet Protocol (IP) address of the home SMSC for the mobile device if the default SMSC determines, based on the MDN, that the default SMSC is not the home SMSC for the mobile device.

2. The method of claim 1, where the receiving one of a hostname of the home SMSC for the mobile device or an Internet Protocol (IP) address of the home SMSC for the mobile device further comprises:
    sending the HTTP post over the wireless data network to the home SMSC for the mobile device.

3. The method of claim 1, where the HTTP post includes:
    a user agent identifier,
    an originating MDN,
    a destination number, and
    a message section.

4. The method of claim 1, where the destination number is:
    a MDN;
    a short code; or
    an email address.

5. The method of claim 1, further comprising:
    receiving, over a wireless voice network, a SMS message from a terminating device.

6. The method of claim 1, further comprising:
    storing the hostname of the home SMSC for the mobile device or the IP address of the home SMSC for the mobile device to use for sending subsequent formatted SMS messages as HTTP posts.

7. The method of claim 1, where the HTTP post includes destination numbers for multiple recipients.

8. A device, comprising:
    a memory to store a short message service center (SMSC)/mobile directory number (MDN) lookup table; and
    a processor to:
        receive, over a wireless data network from a mobile device, a hypertext transfer protocol (HTTP) post that includes a short message service (SMS) message and a MDN of a mobile device;
        conduct a lookup in the SMSC/MDN lookup table to determine the home SMSC for the mobile device based on the MDN;

send, over the wireless data network to the mobile device, one of a hostname of the home SMSC for the mobile device or an Internet Protocol (IP) address of the home SMSC for the mobile device if the device is not the home SMSC for the mobile device.

9. The device of claim 8, where the processor further:
sends the SMS message over a wireless voice network to a terminating device if the device is the home SMSC for the mobile device.

10. The device of claim 8, where the SMSC/MDN lookup table includes a hostname for each SMSC included in the table.

11. The device of claim 8, where the HTTP post further includes:
a user agent of the mobile device,
an MDN for a terminating device, and
a message identifier.

12. A method, comprising:
sending a short message service (SMS) message over a wireless data network, the SMS message including a mobile directory number (MDN) of an originating mobile device;
receiving the SMS message including the MDN of the originating mobile device;
conducting a lookup to determine a home short message service center (SMSC) for the originating mobile device based on the MDN;
sending the SMS message over a wireless voice network to a terminating device if the computing device is the home SMSC for the originating mobile device; and
sending a confirmation message over the wireless data network to the originating mobile device,
where the SMS message is formatted as a hypertext transfer protocol (HTTP) post that includes a user agent identifier, an originating MDN, a destination number, a message section, and a message identifier.

13. The method of claim 12, further comprising:
sending a redirect message over the wireless data network to the originating mobile device if the computing device is not the home SMSC for the terminating device.

14. The method of claim 12, where the lookup is performed using a lookup table stored in an associated memory.

15. The method of claim 14, where the lookup table includes a host name for multiple SMSCs in a wireless carrier network.

16. The method of claim 13, where the redirect message comprises one of:
a hostname for the home SMSC for the originating device, or
an Internet Protocol (IP) address for the home SMSC for the originating device.

17. The method of claim 12, where the HTTP post includes:
a user agent section,
an originating MDN section,
a destination number section,
a message section, and
a message identifier section.

18. The method of claim 12, further comprising:
sending, in response to sending the SMS message to the terminating device, a positive reply over the wireless data network to the originating mobile device.

19. The method of claim 12, further comprising:
sending in response to not sending the SMS message to the terminating device, a negative reply to the originating device, the negative reply including at least one of:
an indication of activity outside of limits set by parental controls,
an indication of filter restrictions for particular recipients,
an indication of an account status error, or
an indication of a block on SMS services for the originating mobile device.

20. A memory device to store instructions comprising:
one or more instructions, which when executed on a computer device, cause the computer device to format a short message service (SMS) message as a hypertext transfer protocol (HTTP) post, the HTTP post including a mobile directory number (MDN) of the mobile device;
one or more instructions, which when executed on the computer device, cause the computer device to send the HTTP post over a wireless data network to a default short message service center (SMSC) for the mobile device;
one or more instructions, which when executed on the computer device, cause the computer device to receive a confirmation from the default SMSC for the mobile device if the default SMSC determines, based on the MDN, that the default SMSC is also a home SMSC for the mobile device; and
one or more instructions, which when executed on the computer device, cause the computer device to receive one of a hostname of the home SMSC for the mobile device or an Internet Protocol (IP) address of the home SMSC for the mobile device if the default SMSC determines, based on the MDN, that the default SMSC is not the home SMSC for the mobile device.

21. The memory device of claim 20, where the one or more instructions to receive one of a hostname of the home SMSC for the mobile device or an Internet Protocol (IP) address of the home SMSC for the mobile device further comprise:
one or more instruction, which when executed on the computer device, cause the computer device to send the HTTP post over the wireless data network to the home SMSC for the mobile device.

22. The memory device of claim 20, where the instructions further comprise:
one or more instructions, which when executed on the computer device, cause the computer device to receive, over a wireless voice network, a SMS message from a terminating device.

23. The memory device of claim 20, where the instructions further comprise:
one or more instructions, which when executed on the computer device, cause the computer device to store the hostname of the home SMSC for the mobile device or the IP address of the home SMSC for the mobile device to use for sending subsequent formatted SMS messages as HTTP posts.

* * * * *